United States Patent
Yu et al.

(10) Patent No.: US 6,828,011 B2
(45) Date of Patent: Dec. 7, 2004

(54) MOISTURE CROSSLINKABLE THERMOPLASTICS IN THE MANUFACTURE OF VEHICLE WEATHER STRIPS

(75) Inventors: Zuoxing Yu, Stratford (CA);
Hans-Joachim Graf, Stratford (CA);
Tim Pauli, Stratford (CA)

(73) Assignee: Cooper Technology Services, LLC, Findlay, OH (US)

( * ) Notice: Subject to any disclaimer, the term of this patent is extended or adjusted under 35 U.S.C. 154(b) by 17 days.

(21) Appl. No.: 09/912,099

(22) Filed: Jul. 24, 2001

(65) Prior Publication Data

US 2003/0021986 A1 Jan. 30, 2003

(51) Int. Cl.$^7$ .......................... B32B 27/00; B32B 27/08
(52) U.S. Cl. .................. 428/220; 428/332; 428/337; 428/339; 428/500; 428/515; 428/908.8; 428/923; 428/926
(58) Field of Search .................. 428/31, 220, 332, 428/337, 339, 411.1, 500, 515, 908.8, 923, 926

(56) References Cited

U.S. PATENT DOCUMENTS

| | | |
|---|---|---|
| 3,067,455 A | 12/1962 | Reid ........................... 156/465 |
| 3,177,534 A | 4/1965 | Millhouse et al. ............ 52/394 |
| 3,333,381 A | 8/1967 | Stark et al. ............ 52/204.597 |
| 3,646,155 A | 2/1972 | Scott ........................... 525/288 |
| 3,825,459 A | 7/1974 | Taylor ................... 156/244.18 |
| 4,381,273 A | 4/1983 | Azzola ...................... 264/45.9 |
| 4,411,941 A | 10/1983 | Azzola ........................ 428/122 |
| 4,513,044 A | 4/1985 | Shigeki et al. .............. 428/122 |
| 4,668,556 A | 5/1987 | Hermann et al. ........... 428/122 |
| 4,859,391 A | 8/1989 | Jackson ....................... 264/162 |
| 4,913,976 A | 4/1990 | Brooks et al. .............. 428/494 |
| 4,923,759 A | 5/1990 | Brooks et al. .............. 428/521 |
| 4,936,126 A | 6/1990 | Sato ............................ 72/20.1 |
| 4,975,306 A | 12/1990 | Jackson ........................ 428/31 |
| 4,994,311 A | 2/1991 | Junker ........................ 428/122 |
| 5,183,613 A | 2/1993 | Edwards ................ 264/173.19 |
| 5,221,564 A | 6/1993 | Keys ............................ 428/31 |
| 5,279,782 A | 1/1994 | Yamamoto et al. ......... 264/162 |
| 5,411,785 A | 5/1995 | Cook ........................ 428/122 |
| 5,415,822 A | 5/1995 | Cook .................... 264/173.17 |
| 5,635,274 A | 6/1997 | Chihara et al. ............. 428/122 |
| 5,686,165 A | 11/1997 | Cook ........................ 428/122 |
| 5,736,215 A | 4/1998 | Buchholz et al. ............. 428/99 |
| 5,753,063 A | 5/1998 | Sakakibara et al. ......... 156/219 |
| 6,012,760 A | 1/2000 | Nozaki .................... 296/146.9 |
| 6,024,906 A | 2/2000 | Cook ..................... 264/177.2 |
| 6,099,676 A | 8/2000 | Hayashi ................. 156/244.23 |
| 6,110,546 A * | 8/2000 | Honda et al. ................. 428/31 |
| 6,245,409 B1 | 6/2001 | Cook ........................ 428/122 |

FOREIGN PATENT DOCUMENTS

| | | |
|---|---|---|
| GB | 1242436 | 12/1968 |
| GB | 1545511 | 5/1975 |

OTHER PUBLICATIONS

Harry Allcock and Frederick Lampe, Contemporary Polymer Chemistry, $2^{nd}$ Edition, 1990.*

* cited by examiner

*Primary Examiner*—Sheeba Ahmed
(74) *Attorney, Agent, or Firm*—Fay, Sharpe, Fagan, Minnich & McKee, LLP (57) ABSTRACT

Methods for forming a composite extrusion for use as a vehicle weather strip and the products formed thereby are disclosed in which a main body member is formed from an elastomeric thermoset rubber and an abrasion resistant decorative layer comprised of a crosslinkable thermoplastic is extruded thereon. The crosslinkable thermoplastic may be an ethylene-octene copolymer or a copolymerized ethylene-styrene interpolymer. The thermoplastic contains grafted silane functional groups to allow the thermoplastic to be crosslinked in the presence of moisture. The abrasion resistant decorative layer may be extruded onto the thermoset either prior to or after the thermoset is cured and either prior to or after the abrasion resistant decorative layer is crosslinked. The material of the abrasion resistant decorative layer may be extruded into sheet form and laminated onto the main body member.

10 Claims, 5 Drawing Sheets

MOISTURE CROSSLINKABLE THERMOPLASTICS IN THE MANUFACTURE OF VEHICLE WEATHER STRIPS

BACKGROUND OF THE INVENTION

1. Field of the Invention

The present invention relates to a process for forming composite extrusions and the products formed thereby, particularly automobile weather strips. More particularly, the present invention pertains to vehicle weather strip composite extrusions comprised of an elastomeric thermoset and a crosslinked thermoplastic.

2. Discussion of the Art

It is common in the motor vehicle industry to fashion decorative abrasion resistant sections for various parts of an automobile by extruding such sections from certain thermosetting polymeric materials. Examples of typical abrasion resistant sections manufactured by such a process include colored weather strips. These weather strips are mounted on an automobile door surface and along the perimeter of automobile doors to provide a seal between the door and the automobile body as well as to protect both the door and exterior objects when they come in contact with each other. Weather strips are typically extruded and attached to a vehicle by an adhesive tape.

Various thermoset elastomeric rubber materials, such as ethylene propylene diene terpolymer (EPDM), styrene-butadiene copolymer (SBR) and chloroprene rubbers have been used to form these weather strips. These materials are favored by manufacturers because they are relatively inexpensive compared to thermoplastics and generally exhibit both the desired flexibility necessary for providing an effective seal and acceptable weatherability properties. However, these elastomers typically lack the low-friction, abrasion resistance that is necessary at the point of contact with exterior objects for extended life of the weather strips.

Manufacturers have therefore attempted a variety of approaches to improve the wear resistance and other properties of elastomeric sealing sections. One strategy for weather strips has been to apply a second layer of low friction polymer to the surface of the elastomeric weather strip along the area that is exposed to the exterior. Incorporated within the second layer can be various pigments or dyes such that the surface of the weather strip matches the color of the automobile. Depending on the composition of the main body of the weather strip, this second layer is often formed from polyvinyl chloride (PVC) or an uncured non-polar thermoplastic elastomer, such as polypropylene or polyethylene. These second layers are usually applied directly to the weather strip surface by lamination or as a solvent-based spray, or after an application of a primer or adhesive layer to the elastomer. However, these methods are not completely satisfactory. In addition to longer processing time and added material cost, it is difficult to obtain a satisfactory bond between the elastomer and the surface coating. Sprayed on coatings are prone to cracking while an adhered layer is susceptible to peeling.

Another method that manufacturers have used to adhere the second layer to the extruded weather strip is to cohesively bond a layer of wear resistant thermoplastic to the weather strip. Several techniques have been developed to accomplish this. According to one method, the elastomer rubber and the second layer are co-extruded. The resulting composite is then passed through an oven in which the elastomer rubber is cured and the interface between the second layer and the rubber is heated to such a degree that the second layer partially melts, causing it to adhesively bond with the rubber. Alternately, the rubber is extruded first and passes through an oven in which it is at least partially cured. A molten thermoplastic is then extruded onto the vulcanized rubber. The residual heat of the rubber as it emerges from the oven promotes interdiffusion of the two layers at the interface between the two, forming a bond between the two materials.

Due in part to the uncrosslinked nature of the thermoplastic, however, it is difficult to control exactly the degree of melting that the second layer undergoes in this technique. If the second layer melts too much, the abrasion resistance it affords will be compromised and its aesthetic appeal diminished. Thus, there is a need for a new vehicle weather strip composite that overcomes the deficiencies and limitations of the prior art.

BRIEF SUMMARY OF THE INVENTION

The present invention provides a process for forming an extruded automobile weather strip comprising a main body member of elastomeric rubber and an abrasion resistant decorative layer, the abrasion resistant decorative layer comprising a crosslinkable olefinic thermoplastic or a crosslinkable copolymerized ethylene-styrene interpolymer thermoplastic. The use of a crosslinkable thermoplastic allows a manufacturer to maintain the desirable qualities associated with thermoplastics while affording greater control of melting and alleviating other processing concerns. In a preferred embodiment, the elastomeric rubber is EPDM and the crosslinkable thermoplastic is a moisture curable ethylene-$\alpha$-olefin copolymer or a crosslinkable copolymerized ethylene-styrene interpolymer. The crosslinkable thermoplastic may contain grafted silane functional groups. In the presence of moisture, water hydrolyzes the silane. Under the action of a catalyst, the resulting silanol groups then condense to form intermolecular crosslinking sites. The thermoset elastomer rubber may be cured by sulfur or peroxide agents. The crosslinkable thermoplastic can be applied to the elastomer rubber main body member by extruding the material directly onto the rubber or by extruding the material into a tape form and applying the tape to the EPDM by means of a laminating technique.

The versatility of crosslinkable thermoplastics allows them to be applied to the elastomer rubber member in several ways. In a first preferred technique, the crosslinkable thermoplastic is co-extruded with an uncured thermoset elastomer rubber main body member and then exposed to water to crosslink the copolymer. The resultant composite is then passed through an oven to vulcanize the thermoset elastomer rubber. In a second preferred technique, the crosslinkable thermoplastic is step extruded onto a previously cured or partially cured thermoset elastomer rubber main body member and then crosslinked by immersion in a water bath, or otherwise exposed to moisture. In a third preferred technique, the crosslinkable thermoplastic is extruded into a sheet or tape form and laminated onto a previously cured or partially cured thermoset elastomer rubber main body member. The resulting composite is then subjected to a water bath, or otherwise exposed to moisture, to crosslink the grafted silane groups.

While all the techniques produce acceptable results, if the crosslinkable thermoplastic is applied to the thermoset elastomer prior to the curing of the elastomer, the thermoplastic should be crosslinked before the elastomer is cured. This is to ensure that the thermoplastic does not melt excessively during the subsequent heating.

DETAILED DESCRIPTION OF THE PREFERRED EMBODIMENTS

The present invention provides a variety of sealing strips and weather strips for vehicles. Briefly, the weather strips preferably comprise at least two components, each formed from particular materials and having a unique cross-sectional configuration. A preferred weather strip comprises a thermoset elastomer rubber main body member having any of several shapes conventional in the art.

The weather strip also comprises an abrasion resistant decorative layer comprised of an abrasion resistant material disposed on the outwardly facing surface of the main body member. As explained in greater detail below, the layer preferably comprises a moisture crosslinkable ethylene-α-olefin copolymer or a crosslinkable copolymerized ethylene-styrene interpolymer, With reference to FIG. 1, a cross-section of a preferred embodiment weather strip for a vehicle in accordance with the present invention is shown. The preferred embodiment weather strip is comprised of a main body member 2, made from one or more of a number of elastomeric thermoset rubbers known in the art to be suitable for weather strip applications, and an abrasion resistant decorative layer 4.

Suitable elastomeric rubber compositions for use in the main body member include, but are not limited to, ethylene-α-olefin-non-conjugated diene rubbers (EODM), styrene-butadiene rubbers (SBR), acrylonitrile-butadiene rubber, natural or synthetic isoprene rubber and chloroprene rubber. EODM rubbers are preferred due to their oxygen, ozone and weather resistance. Suitable α-olefins include, but not limited to, propylene, 1-butene, 1-pentene, 1-hexene, 1-octene and 1-decene. A preferred α-olefin is propylene. A preferred group of EODM compounds suitable for the present invention are ethylene-propylene-diene terpolymers (EPDM). Suitable non-conjugated dienes include, but not limited to, 1,4-hexadiene, dicyclopentadiene and 5-ethylidene-2-norbornene. A preferred EODM for the main body member of the weather strip of the present invention is ethylene-propylene-ethylidene-norbornene terpolymer or ethylene-propylene-dicyclopentadiene terpolymer. Various grades of elastomer thermoset rubber may be used in the invention including dense elastomers and less dense, sponge elastomers.

The elastomer rubber of the main body member can further include various additives known in the art in such concentrations that do not adversely affect the properties of the compound. Such additives include, but are not limited to, vulcanization agents, carbon black, lubricants, plasticizers, fillers, slip agents, processing oils and antioxidants. These additives are added to the elastomer prior to extrusion.

Figure 1:
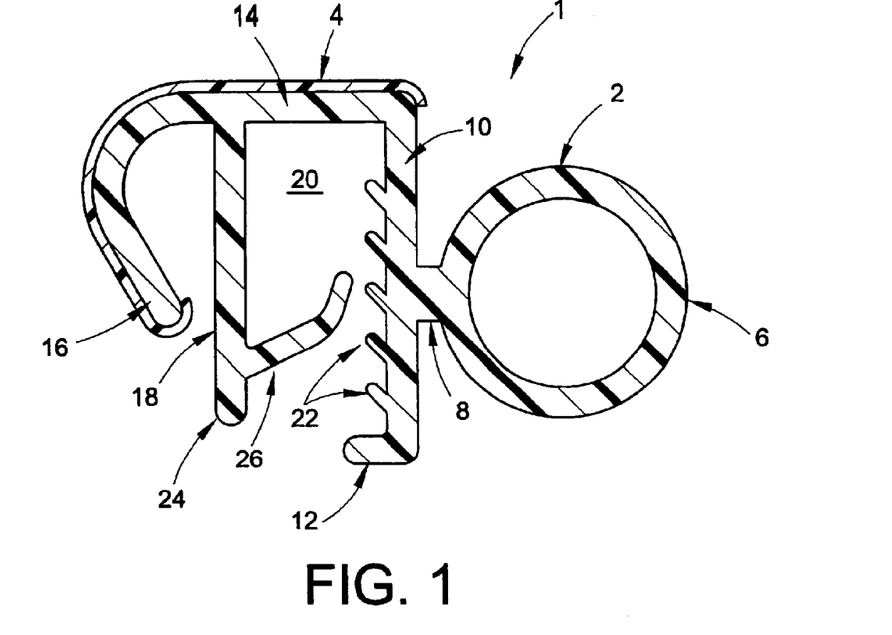
FIG. 1 is a cross section of a preferred embodiment weather strip for a vehicle in accordance with the present invention.

In one preferred embodiment (FIG. 1), the main body member 2 is formed having a hollow tube 6 joined along its longitudinal axis at a region 8 on its outer circumference to a tangential wall 10. Attached to one end of the tangential wall is a retention spur 12. Attached to an opposite end of the tangential wall is a second wall 14. The second wall 14 is substantially perpendicular to the tangential wall 10 at the junction between them, but gently curls back toward the tangential wall as the second wall 14 extends from the tangential wall 10. The second wall 14 terminates at and defines its distal end 16 as shown in FIG. 1. Approximately midway between the junction of the tangential wall 10 and the second wall 14, and the distal end 16 of the second wall 14, a third wall 18 substantially parallel to the tangential wall 10 extends from the second wall 14. Together, the tangential wall 10, the second wall 14 and the third wall 18 define an interior chamber 20. Projecting from the tangential wall 10 on an opposite side from the hollow tube 6 are a plurality of sealing lips 22 that extend inward and upward therefrom toward the interior chamber 20. Attached to a distal end 24 of the third wall 18 and projecting inward and upward therefrom toward the interior chamber 20 is a large sealing lip 26. Depending on the make of the automobile and the shape of the chassis and doorframe, many alternative embodiments are also contemplated.

Irrespective of the exact shape of the main body member, extruded onto an exteriorly directed top surface (not numbered) of the second wall 14 of the main body member 2 is the abrasion resistant decorative layer 4 comprised of a crosslinkable thermoplastic. This abrasion resistant decorative layer 4 is applied along the main body member at those areas that contact the door, vehicle frame or exterior objects (not pictured) to improve the wear resistance and aesthetics of the weather strip at those locations. In addition, the abrasion resistant decorative layer 4 may be extruded onto other areas of the main body member 2 that contact these objects for added protection and scuff resistance, such as the various surfaces of the main body member (not numbered) that are exposed to and face the interior chamber 20.

As explained in greater detail herein, in the final composite extrusion, such as incorporated into a door or window assembly, the abrasion resistant decorative layer comprising at least one crosslinkable thermoplastic is at least partially crosslinked. Thus, although much of the description herein refers to the abrasion resistant decorative layer as comprising a crosslinkable material (as noted above), it will be understood that in its preferred final manufactured form, the composite extrusion of the present invention utilizes an abrasion resistant decorative layer that comprises an at least partially crosslinked material.

In a particular embodiment of the invention, the abrasion resistant decorative layer 4 is comprised of a crosslinkable olefinic thermoplastic. A preferred thermoplastic is a crosslinkable ethylene-α-olefin copolymer that can be crosslinked by peroxide, silane or electron beam radiation. Electron beam radiation crosslinking is not preferred because of its expense. Likewise, peroxide crosslinking is not preferred because of the processing concerns that it entails. However, it is contemplated that the present invention weather strip and related methods could utilize such techniques for crosslinking. Preferred ethylene-α-olefin copolymers include silane grafted, metallocene catalyzed ethylene-butene, ethylene-hexene, ethylene-1-octene, and other ethylene alpha olefin copolymers. A most preferred ethylene-α-olefin copolymer for use in the present invention is silane grafted ethylene-octene copolymer. One stage silane crosslinking involves the extrusion of a direct mixture of the ethylene-α-olefin copolymer resin with a silane concentrate that includes a catalyst. The extrudate is subsequently crosslinked in the presence of water. In two-stage crosslinking, silane is first grafted to the ethylene-α-olefin copolymer molecular chains according to known reactions to yield a silane grafted copolymer.

PE BACKBONE

SILANE GRAFT

Subsequently, the silane-grafted copolymer is mixed with a silanol condensation catalyst and then exposed to water to effect crosslinking of the copolymer in a two step reaction. First, the water hydrolyzes the silane to produce a silanol. The silanol then condenses to form intermolecular, irreversible Si—O—Si crosslink sites.

STEP 1:

STEP 2:

CROSS-LINK

The amount of crosslinked silane groups, and thus the final polymer properties, can be regulated by controlling the production process, including the amount of catalyst used. A gel test (ASTM D2765) is used to determine the amount of crosslinking. Prior to being silane grafted, the ethylene-α-olefin copolymer used in the invention preferably has a melt flow index determined according to ASTM D-1238 of about 0.5–50 g/10 min and a Shore A hardness of about 60–90. Most preferably, the ethylene-α-olefin copolymer used in the invention exhibits a melt flow index of about 5 g/10 min at 230° C. with a 2.16 kg load, a Shore A hardness of about 70 and a density of about 0.8–1.2 g/cm$^3$. The catalyst can be any of a wide variety of materials that are known to function as silanol condensation catalysts including many metal carboxylates and fatty acids. A preferred catalyst is dibutyltindilaurate. A silane grafted ethylene-octene copolymer base resin suitable for the present application is available from Cellect LLC (formerly Sentinel Polyolefins) under the trade name Thermochrome B® or from Dupont-Dow Elastomers LLC under the trade name Engage®. The crosslinkable thermoplastic can contain conventional additives including, but not limited to, organic and inorganic fillers, plasticizers, slip agents, stabilizers and, as previously mentioned, coloring agents.

In a second preferred embodiment of the invention, the abrasion resistant decorative layer is comprised of a crosslinkable copolymerized ethylene-styrene interpolymer. This material is an interpolymer based on the copolymerization of ethylene and styrene. The interpolymer can have a styrene content of from about 30% to about 70%, preferably from about 30% to about 50% and more preferably about 40% and preferably exhibits a melt index prior to silane grafting of 1.6 g/10 min tested according to ASTM D1238. The interpolymer is polymerized using a metallocene catalyst or other methods known in the art. The ethylene-styrene interpolymer can be blended with other polymers such as polystyrene, polyethylene, polypropylene, as well as others. In addition, other conventional additives can be added to the interpolymer without departing from the scope of the invention such as fillers, plasticizers, oils and pigments. A suitable interpolymer is available from the Dow Chemical Co. under the trade name Index® Interpolymers. As with the ethylene-octene copolymer described previously, the interpolymer is silane grafted to allow it to be moisture crosslinked according to the reaction described above.

After crosslinking, the thermoplastic assumes many of the characteristics associated with a thermoset, to a greater or lesser degree depending on the amount of crosslinking.

The abrasion resistant decorative layer 4 can be applied to the main body member 2 in one of several different ways. For ease of description, the different processes will be described utilizing a two stage crosslinkable, silane-grafted ethylene-octene copolymer as the abrasion resistant decorative layer 4 and EPDM as the thermoset elastomer rubber main body member 2. However, the present invention contemplates the use of other crosslinkable polyolefins as well as an ethylene-styrene interpolymer as the abrasion resistant decorative layer 4 and other elastomers in the main body member 2.

Figure 5:
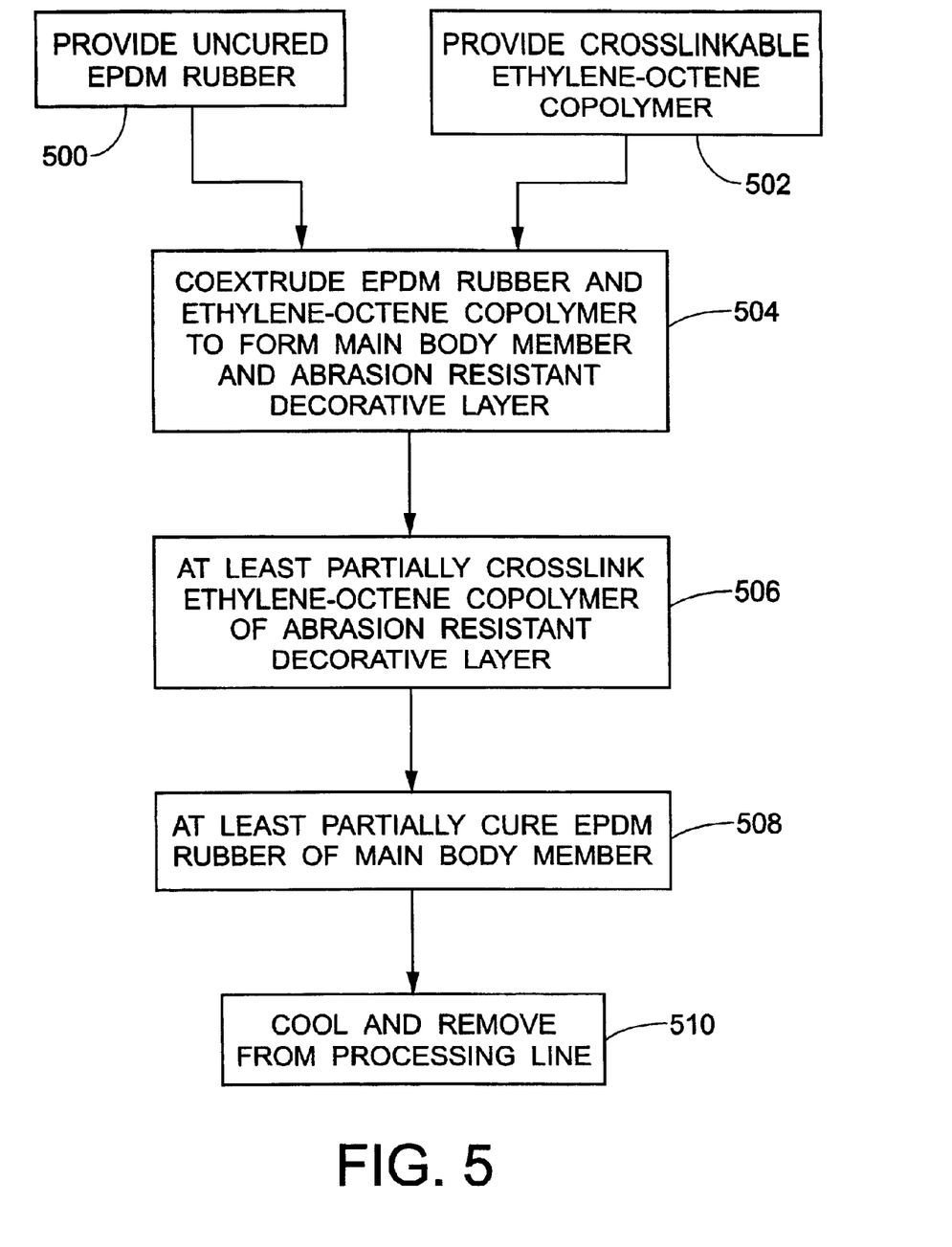
FIG. 5 is a flowchart depicting the main processing steps in the first preferred technique of the invention detailed in FIG. 2.

The present invention provides a first preferred technique for producing a composite extrusion by co-extruding an uncured EPDM main body member, such as item 2 in FIG. 1, and an uncrosslinked silane-grafted ethylene-octene copolymer abrasion resistant decorative layer, such as item 4 in FIG. 1, through an extrusion die. With reference to FIG. 5, a schematic diagram is shown outlining the preferred processing steps in this first preferred technique. Briefly, an uncured EPDM rubber and crosslinkable ethylene-octene copolymer are provided 500, 502. The EPDM rubber and the crosslinkable ethylene-octene copolymer are coextruded 504 to form a main body member and an abrasion resistant decorative layer, respectively. Subsequently, the crosslinkable ethylene-octene copolymer is at least partially crosslinked 506. The EPDM rubber of the main body member is then at least partially cured 508 prior to removal of the assembly from the processing line 510.

Figure 2:
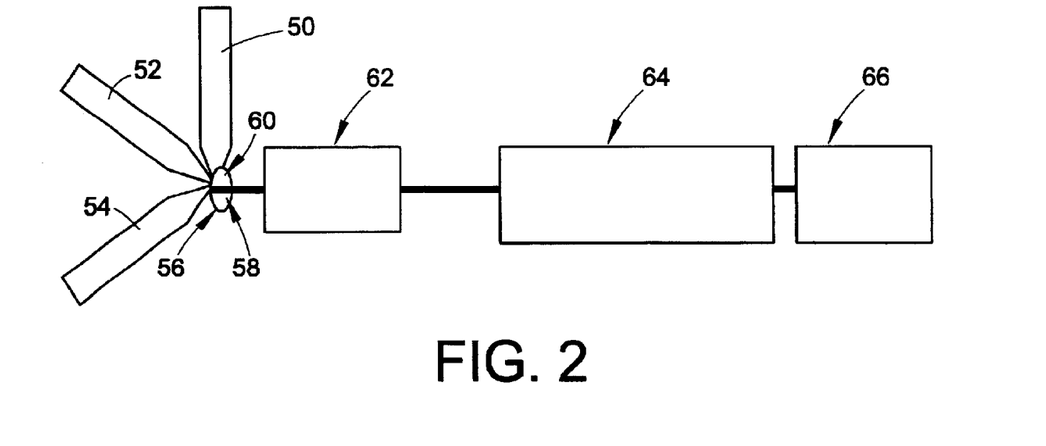
FIG. 2 is a depiction of a first preferred technique of the present invention for manufacturing a composite extrusion suitable for use as weather strip for a vehicle.

With greater detail and with further reference to FIG. 2, a first extruder 50 for processing a silane-grafted crosslinkable ethylene-octene copolymer, a second extruder 52 for processing a sponge EPDM and a third extruder 54 for processing a dense EPDM are placed in communication with an extrusion die 56. The term "sponge EPDM" refers to an EPDM that contains blowing agents. The term "dense EPDM" refers to an EPDM that does not contain any blowing agents. For ease of description, the production process will be described using the dense extruder 54, although in actual practice both are typically used concurrently, depending on the application. In order to ensure sufficient flow of the EPDM compound for subsequent extrusion, the EPDM extruder 54 is preferably maintained at a temperature of from about 70° C. to about 85° C. For the same reason, the ethylene-octene copolymer extruder 50 is preferably maintained at about 130° C. to about 210° C. The extrusion die 56 is preferably maintained at about 110° C. on an EPDM side 58 and from about 200° C. to about 260° C. on an ethylene-octene copolymer side 60. Insulation (not shown) between the two sides of the extrusion die allows for this disparity in temperatures to be achieved. For a dense EPDM, the EPDM is extruded at a pressure of from about 2000 to about 5000 psi, and most preferably about 4000 psi. For a sponge EPDM, the EPDM is extruded at a pressure of about 1000 psi to about 3000 psi, most preferably about 2500 psi. The ethylene-octene copolymer and EPDM are co-extruded such that the ethylene-octene copolymer mechanically bonds with the EPDM through molecular chain inter-diffusion and entanglement. The thickness of the resulting ethylene-octene copolymer layer is preferably from about 0.1 to about 1.5 mm, and typically about 0.5 mm.

Referring further to FIG. 2, the composite extrusion (not shown) comprising the extruded EPDM and ethylene-octene copolymer is then passed through a steam bath 62 to effect crosslinking of the ethylene-octene copolymer. The steam bath 62 is preferably maintained at a temperature of from about 100° C. to about 110° C. To cure the EPDM, the composite extrusion is then passed through an oven 64 or other curing device at a temperature of from about 180° C. to about 270° C., depending on the grade of EPDM used in the main body member 2. In a particularly preferred embodiment, the composite extrusion is passed through a number of temperature zones in the oven 64 starting at about 200° C. for about 15 to about 50 seconds, ramping up to about 220° C. for about 45 seconds to about 2.4 minutes, and then ramping down to about 210° C. for about 15 to about 50 seconds, prior to exiting the oven 64. Preferably, the total oven cure time is between about 1 minute and about 4 minutes. The composite extrusion is then cooled in a water or air cooling tank 66 at about 30° C. to 90° C., and most preferably about 60° C., before removing the composite extrusion from the manufacturing line.

Figure 6:
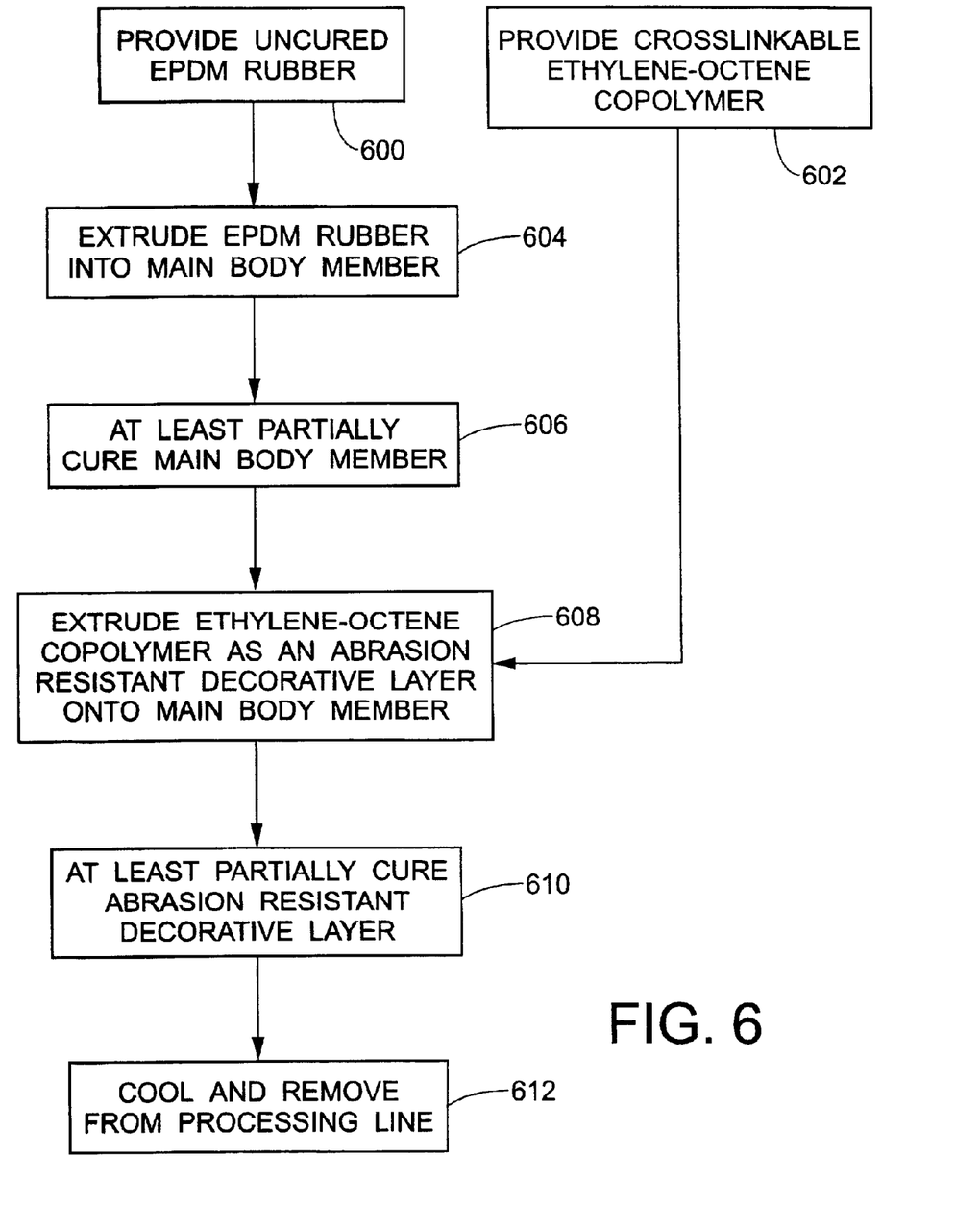
FIG. 6 is a flowchart depicting the main processing steps in the second preferred technique of the invention detailed in FIG. 3.

In a second preferred technique in accordance with the present invention, uncured ethylene-octene copolymer is extruded onto the main body member after the EPDM has been at least partially cured. With reference to FIG. 6, a schematic diagram is shown outlining the processing steps in this third preferred technique. Briefly, an EPDM rubber and crosslinkable ethylene-octene copolymer are provided 600, 602. The EPDM rubber is extruded 604 into a main body member and the main body member is subsequently at least partially cured 606. The crosslinkable ethylene-octene copolymer is extruded 608 as an abrasion resistant decorative layer onto the main body member. The abrasion resistant layer is crosslinked 610 and then cooled prior to removal 612 of the assembly from the processing line.

Figure 3:
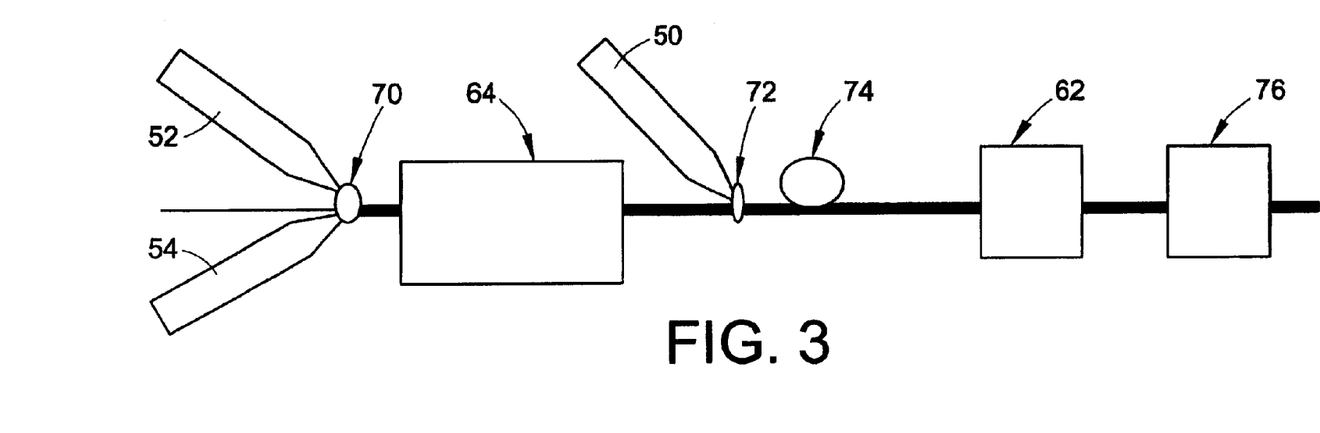
FIG. 3 is a depiction of an alternative preferred technique of the present invention for manufacturing a composite extrusion suitable for use as a weather strip for a vehicle.

With additional detail and with further reference to FIG. 3, an extruder 52 for sponge EPDM and an extruder 54 for dense EPDM are placed in communication with a first extrusion die 70. For ease of description, the production process will be described using only the dense extruder 54, although in actual practice both are typically used concurrently to make different sections of the same part. EPDM is extruded from the rubber extruder 54 through the first die 70 to form a main body member (not shown). The main body member is then passed through an oven 64 to cure the EPDM. Upon emerging from the oven 64, an abrasion resistant layer (not shown) comprising ethylene-octene copolymer is extruded from a second die 72 that is fed by a plastic extruder 50 onto the cured main body member to form a composite extrusion. The residual heat of the EPDM main body member mechanically bonds the ethylene-octene copolymer therewith through diffusion. An embossing wheel 74 assists in bonding the EPDM to the ethylene-octene copolymer by pressing the two layers together. In addition, the embossing wheel 74 may be used to print surface patterns on the composite extrusion (such as a "leather-like" texture). The composite extrusion is passed through a water cooling bath 62 to cool the composite and to crosslink the ethylene-octene copolymer prior to removal 76 from the manufacturing line. The temperatures and pressures for the second technique are preferably similar to those used for the first technique in all respects except that the first die 70 is at a temperature from about 100° C. to about 120° C., the second die 72 is at a temperature from about 200° C. to about 220° C. and the embossing wheel 74 is at a temperature from about 170° C. to about 210° C., and preferably about 185° C.

Figure 7:
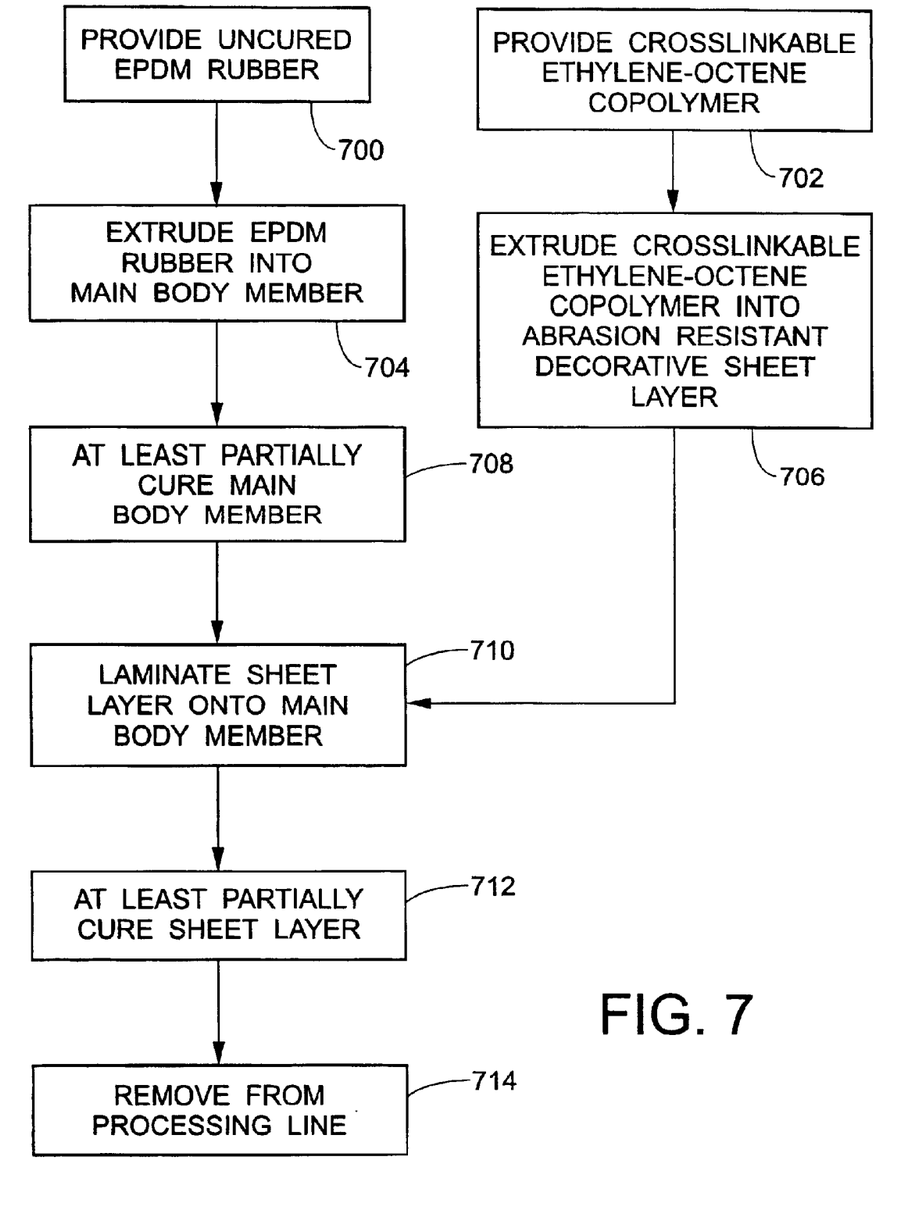
FIG. 7 is a flowchart depicting the main processing steps in the third preferred technique of the invention detailed in FIG. 4.

In a third technique, uncured ethylene-octene copolymer is extruded into a sheet and then laminated onto a cured EPDM main body member. With reference to FIG. 7, a schematic diagram is shown outlining the processing steps in this third preferred technique. Briefly, a thermoset elastomer rubber and a crosslinkable ethylene-octene copolymer are provided 700, 702. The EPDM rubber is extruded 704 into a main body member and the crosslinkable ethylene-octene copolymer is extruded 706 into an abrasion resistant decorative sheet layer. The main body member is at least partially cured 708 and the sheet layer then laminated 710 onto the main body member. The sheet layer is then at least partially crosslinked 712 before the resultant assembly is cooled and removed 714 from the processing line.

Figure 4:
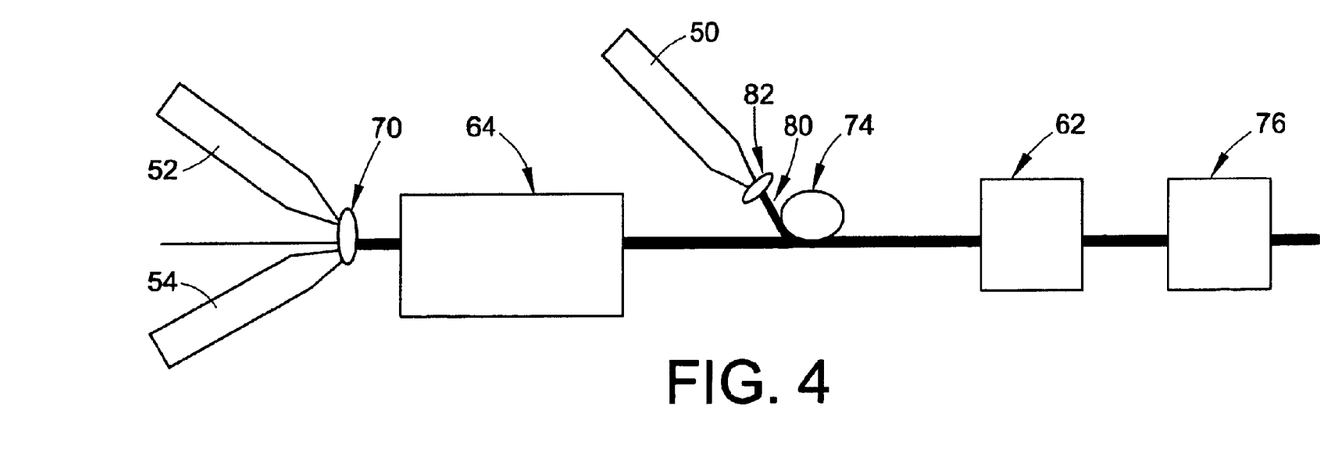
FIG. 4 is a depiction of an another alternative preferred technique of the present invention for manufacturing a composite extrusion suitable for use as a weather strip for a vehicle.

With additional detail and with further reference to FIG. 4, an extruder 52 for sponge EPDM and an extruder 54 for dense EPDM are placed in communication with a first extrusion die 70. As stated earlier, for ease of description, the production process will be described using the dense extruder 54, although in actual practice both are typically used concurrently. EPDM from the rubber extruder 54 is extruded through the first die 70 into a main body member (not shown). The main body member is passed through an oven 64 to cure it. Ethylene-octene copolymer is extruded from a second extruder 50 through a second die 82 to form an abrasion resistant layer in the form of a sheet 80. An embossing wheel 74 then bonds the uncured ethylene-octene copolymer sheet 80 to the main body member to form a composite extrusion (not shown). The composite extrusion is then passed through a water bath 62 to crosslink the ethylene-octene copolymer and to cool the composite prior to removal from the line 76. The temperatures and pressures for the third technique are preferably similar to those used for the first technique in all respects except that the first die 70 temperature is from about 100° C. to about 120° C., the second die 82 temperature is from about 200° C. to about 220° C. and the lamination wheel is at a temperature from about 170° C. to about 210° C., and preferably about 185° C.

While various changes and adaptations may be made to the above methods without departing from the scope of the invention, it is important to note that, with regard to the first preferred technique described, the ethylene-octene copolymer is most preferably crosslinked prior to passing the composite extrusion through the oven to avoid excessive melting of the uncrosslinked ethylene-octene copolymer.

The invention has been described with reference to various preferred embodiments. Obviously, modifications and alterations will occur to others upon a reading and understanding of the specification. The invention is intended to include all such modifications and alterations insofar as they come within the scope of the appended claims and the equivalents thereof. Thus, for example, composite extrusions for other parts (such as automobile glass run channels) in addition to vehicle weather strips can be manufactured by the techniques of the present invention.

What is claimed is:

1. A wear resistant composite extrusion suitable for use as a vehicle weather strip including an abrasion resistant decorative layer comprising an extruded and at least partially crosslinked thermoplastic, wherein said thermoplastic is selected from the group consisting of a moisture crosslinkable ethylene-α-olefin copolymer and a moisture crosslinkable copolymerized ethylene-styrene interpolymer, bonded to and disposed immediately adjacent an extruded and at least partially crosslinked thermoset elastomer rubber main body member.

2. The composite extrusion according to claim 1, wherein said moisture crosslinkable polyolefin ethylene-α-olefin copolymer is a silane grafted ethylene-octene copolymer.

3. The composite extrusion according to claim 2, wherein said thermoset elastomer rubber is an EPDM rubber.

4. The composite extrusion according to claim 1, wherein said abrasion resistant decorative layer is a sheet member.

5. The composite extrusion according to claim 4 wherein said sheet member is laminated and bonded to said main body member.

6. The composite extrusion according to claim 1, wherein said thermoset elastomer rubber has been extruded at a temperature of about 110° C., said crosslinked thermoplastic has been extruded at a temperature of 200° C. to about 260° C., said crosslinked thermoplastic has been at least partially cured in a steam or water bath maintained at a temperature of from about 60° C. to about 110° C., and said thermoset elastomer rubber of said main body member has been at least partially cured at a temperature of from about 180° C. to about 270° C.

7. The composite extrusion according to claim 1, wherein the thickness of said abrasion resistant layer is from about 0.1 to about 1.5 mm.

8. The composite extrusion according to claim 7, wherein the thickness of said abrasion resistant layer is about 0.5 mm.

9. A wear resistant composite extrusion suitable for use as a vehicle weather including an abrasion resistant decorative layer comprising an extruded and at least partially crosslinked thermoplastic, said thermoplastic selected from the group consisting of a moisture crosslinkable ethylene-α-olefin copolymer and a moisture crosslinkable copolymerized ethylene-styrene interpolymer, bonded to and disposed immediately adjacent an extruded and at least partially cured thermoset elastomer rubber main body member, wherein said thermoset elastomer rubber has been extruded at a temperature of about 110° C., said crosslinkable thermoplastic has been extruded at a temperature of 200° C. to about 260° C., and said crosslinkable thermoplastic has been at least partially crosslinked in a steam or water bath maintained at a temperature of from about 60° C. to about 110° C., and further wherein said abrasion resistant decorative layer is about 0.3 to about 0.7 mm thick.

10. The composite extrusion according to claim 9, wherein said moisture crosslinkable ethylene-α-olefin copolymer is a silane grafted ethylene-octene copolymer.

* * * * *